Jan. 1, 1924
V. V. CURTIS
CHECK
Filed April 6, 1923
1,479,534
Fig. 1.
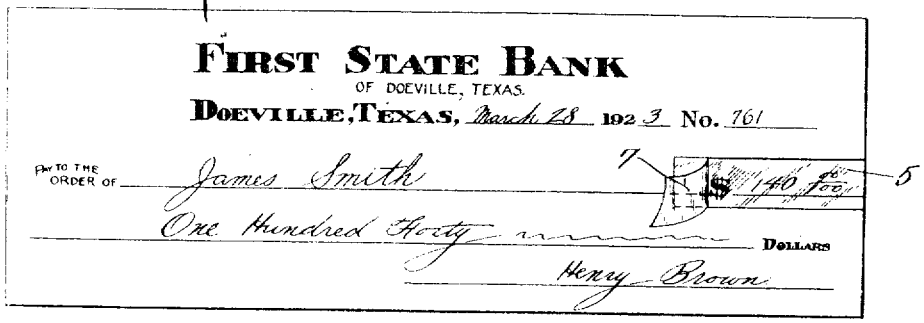
Fig. 2.
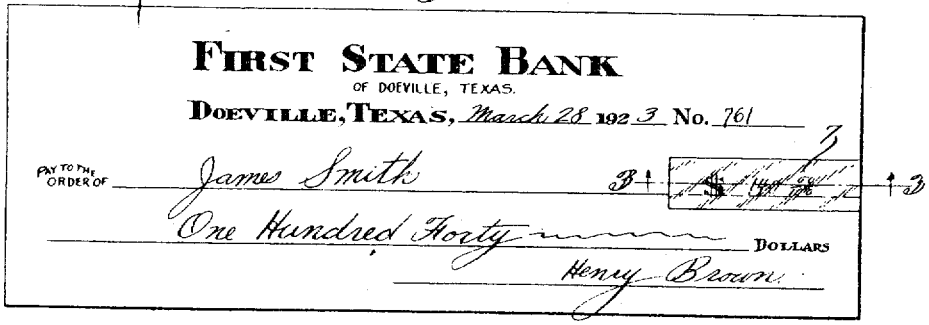
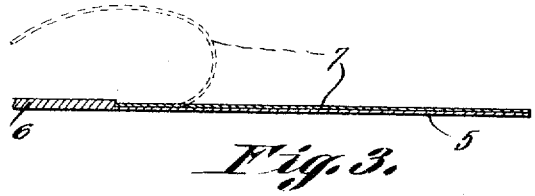
Fig. 3.
V. V. Curtis, Inventor Patented Jan. 1, 1924.

1,479,534

UNITED STATES PATENT OFFICE.

VAN VINCIENT CURTIS, OF McALLEN, TEXAS.

CHECK.

Application filed April 6, 1923. Serial No. 630,313.

*To all whom it may concern:*

Be it known that I, VAN V. CURTIS, a citizen of the United States, residing at McAllen, in the county of Hidalgo and State of Texas, have invented a new and useful Check, of which the following is a specification.

This invention has reference to bank checks, notes or the like, the primary object of the invention being to provide a check wherein it will be impossible for a person to fraudulently alter the check.

Another object of the invention is to provide a check of a construction, whereby the same may be protected against alteration, eliminating the necessity of using any form of cutting or perforated means.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a view representing a check made out prior to applying the protecting means.

Figure 2 is a check disclosing the protecting means as applied.

Figure 3 is a sectional view through a check disclosing the weakened portion thereof, taken on line 3—3 of Figure 2.

Referring to the drawing in detail, a check is shown as ruled in the usual and well known manner, having a line on which the number, representing the amount of the check is placed.

As shown, the check forming the subject matter of the present invention is provided with a weakened portion 5 which embodies a section of the check formed of paper, exceptionally thin and perishable, as compared with the body portion 6 of the check, as clearly shown by Figure 3 of the drawing.

Cooperating with the weakened portion 5 of the check, is a protecting strip 7 formed of translucent paper or other transparent material, the under side of the strip 7 being supplied with adhesive material so that the strip may be moistened and pressed into engagement with the weakened portion of the check to securely unite the strip 7 and weakened portion 5.

It might be further stated that in use, this strip 7 is normally glued to the check at a point adjacent to one end of the strip whereby the strip may be moved away from the weakened portion of the check to permit a person to write on the weakened portion.

From the foregoing it will be obvious that when a check has been made out, the protecting strip 7 is as before stated, securely united with the weakened portion 5 of the strip to the end that while the amount of the check may be observed through the translucent strip 7, if a person should attempt to alter the check by removing the strip 7, the weakened portion of the check would likewise be torn from the check.

Having thus described the invention, what is claimed as new is:—

In a check, a body portion having an integral section formed of relatively thin material, a transparent protecting strip having connection with the body portion at one end of the protecting slip, said protecting slip having its under surface formed with adhesive material to secure the protecting strip to the relatively thin section of the check, and said protecting strip being formed of transparent material.

In testimony that I claim the foregoing as my own, I have hereto affixed my signature in the presence of two witnesses.

VAN VINCIENT CURTIS.

Witnesses:
MARSHALL WHITE,
R. W. BARRON.